United States Patent

Rogers et al.

[11] Patent Number: 5,398,961
[45] Date of Patent: Mar. 21, 1995

[54] FLEXIBLE STRAP ATTACHMENT METHOD AND APPARATUS FOR PASSENGER AIR BAG MODULE COVER

[75] Inventors: Mark Rogers, Roy; Daniel W. Anderson, South Weber, both of Utah; Melinda M. Newhouse, Kennewick, Wash.

[73] Assignee: Morton International, Inc., Chicago, Ill.

[21] Appl. No.: 261,526

[22] Filed: Jun. 17, 1994

[51] Int. Cl.6 .............................................. B60R 21/16
[52] U.S. Cl. .......................... 280/728 B; 280/728 A; 280/732
[58] Field of Search .......... 280/728 B, 728 R, 728 A, 280/731, 732

[56] References Cited

U.S. PATENT DOCUMENTS 5,096,221  3/1992  Combs et al. .................... 280/732
5,332,257  7/1994  Rogers et al. .................... 280/728 B
5,348,339  9/1994  Turner .............................. 280/732 Y

FOREIGN PATENT DOCUMENTS 0227753  10/1991  Japan ............................... 280/728 B Primary Examiner—Margaret A. Focarino
Assistant Examiner—Christopher P. Ellis
Attorney, Agent, or Firm—Gerald K. White

[57] ABSTRACT

A fastening method and apparatus for attaching an automotive vehicle instrument panel air bag deployment door, an air bag module cover, to a passenger air bag module reaction canister. The apparatus provides a reliable cover release mechanism during an air bag deployment while allowing relative flexibility between the cover and reaction canister. The flexibility feature eliminates tolerance stack up problems by allowing the cover to locate off the instrument panel where it is intended to fit.

12 Claims, 4 Drawing Sheets

FLEXIBLE STRAP ATTACHMENT METHOD AND APPARATUS FOR PASSENGER AIR BAG MODULE COVER

BACKGROUND OF THE INVENTION

1. Field of the Invention

The present invention relates to passive restraint systems for automotive vehicles that have been devised to be deployed during a collision to cushion passengers to prevent or reduce the severity of possible injury. More particularly, the invention relates to an improved passenger air bag module cover attachment method and apparatus.

2. Description of the Prior Art

In air bag installations for protecting passengers in automotive vehicles, an air bag module comprised of a reaction canister holding a folded air bag and an inflation device is stored behind a section of a vehicle interior trim panel such as the instrument panel. The air bag is inflated to be deployed within the passenger compartment on the occurrence of a collision, and thus must enter the passenger compartment through an opening in the instrument panel. Typically, the opening is closed by a cover provided on the air bag module for enclosing the folded air bag within the reaction canister. Adverse effect on the interior finishing of the vehicle is avoided by providing a surface trim for the cover that matches that of the instrument panel surface so that there is no visible delineation of the opening prior to activation of the air bag module.

A problem that has long existed in such inflation passive restraint systems for use in automotive vehicles for restraining the movement of a passenger during a collision has been that of controlling the fit of the air bag module and making the cover thereof flush, that is, even or level, with the surface of the instrument panel. Methods employed in the prior art have included the insertion of shims behind and beneath the air bag module so that the rigidly attached cover could be manipulated into the proper flush position.

Thus, there has existed a need and a demand for a better solution to this problem. The present invention was devised to fill the technological gap that has existed in the art in this respect.

SUMMARY OF THE INVENTION

An object of the invention is to provide a novel method of providing a reliable release for the cover of a passenger air bag module during deployment of the air bag responsively to the onset of a collision while allowing relative flexibility between the cover and the reaction canister of the air bag module, thereby to eliminate tolerance stack up problems by allowing the location of the cover to be determined by the instrument panel where it is intended to fit.

Another object of the invention is to provide a novel fastening apparatus for attaching a cover to a passenger air bag module reaction canister, which apparatus provides a reliable cover release during air bag deployment, while allowing relative flexibility between the cover and the reaction canister, and thereby eliminates tolerance stack up problems by allowing the cover to locate off the instrument panel where it is intended to fit.

A further object of the invention is to provide an air bag means including a folded air bag and inflating means for inflating the folded air bag with both being stored behind an interior trim panel within the passenger compartment of an automotive vehicle, the folded air bag being inflated to be deployed into said passenger compartment during a collision through a deployment door formed in an opening in the trim panel, the trim panel being comprised of an outer decorative layer and a substrate including a supporting backing layer, the backing layer being formed with a ledge that contributes partly at least to the definition of the opening formed in the trim panel, the air bag means including a reaction canister in which the folded air bag and the means for inflating the folded air bag are contained and a cover enclosing the folded air bag and the means for inflating the folded air bag, the cover having the shape of and comprising the deployment door formed in the trim panel, support means behind said trim panel forming a seat for the reaction canister when the air bag means is installed in the trim panel, and flexible strap means connecting the cover to the reaction canister with the arrangement being such that the cover is pulled up against the ledge on the backing layer of the trim panel and comes to a stop before the reaction canister is seated against the support means behind the trim panel forming a seat for the reaction canister, whereby the cover is allowed to float above the reaction canister and locate off the opening in the trim panel where it is intended to fit.

In accomplishing these and other objectives of the invention, there is provided an attachment device consisting of a molded strap of flexible material of appropriate tensile strength. The straps are intended to be used in sets. For example, two or four straps could be used for a given cover attachment situation. One end of each strap is riveted or otherwise attached to an integral flange protruding from a module cover substrate. The other end of each strap is attached to the reaction canister. Each strap is of appropriate length, width and tensile properties to provide the desired tension on the module cover relative to the reaction canister when the air bag module is mounted in the instrument panel of an automotive vehicle.

In accordance with the invention, the module cover is located or positioned relative to the corresponding opening in the front or top surface of the instrument panel. This opening provides a positive stop or ledge for the cover to be pulled up against. As the module is inserted into the instrument panel opening, the cover comes into its fully seated position just slightly before the reaction canister reaches its own fully seated position. Consequently, the attachment straps are pulled into tension as the reaction canister is seated. The flexibility of the straps allows the cover to "float" rather than being held to a strict dimensional relationship to the module canister. Therefore, while the cover is actually attached to the reaction canister, it is located relative to the instrument panel opening.

Upon deployment of the air bag, each attachment strap breaks or fails at a predetermined point such as at a reduced section or perforation designed to accommodate and control the breaking. The breakout pressure of the module can be controlled by the design characteristics of the failure point.

A separate flexible tether between the cover and the reaction canister of the module retains the cover upon air bag deployment and prevents the cover from flying off into the passenger compartment of the vehicle.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

DESCRIPTION OF THE DRAWINGS

With this description of the invention, a detailed description follows with reference being made to the accompanying drawings which form part of the specification, of which.

DESCRIPTION OF THE PREFERRED EMBODIMENT

Figure 1:
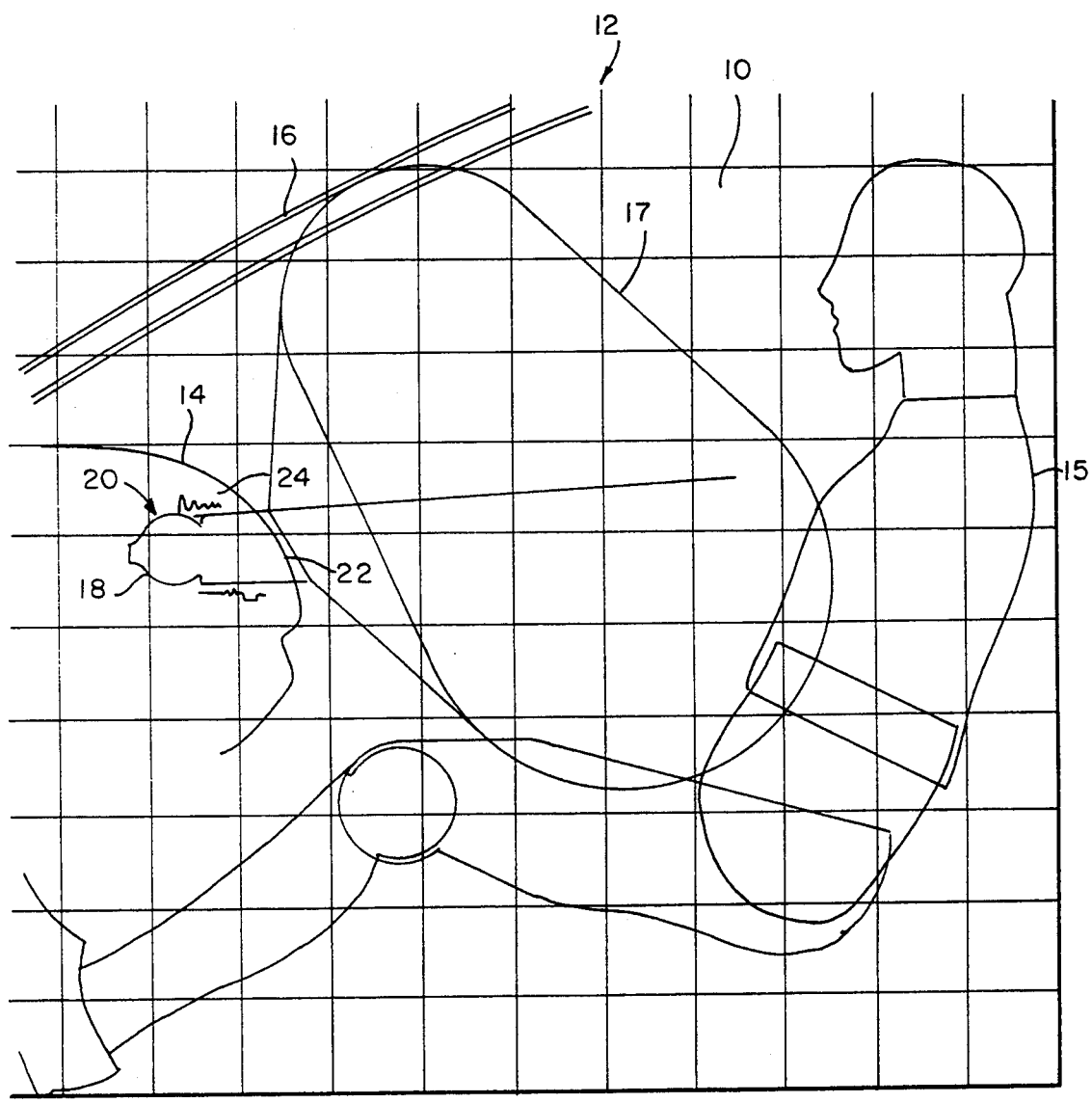
FIG. 1 is a schematic view illustrating a vehicle instrument panel located air bag module installation utilizing a closure arrangement according to the present invention.

Referring to the drawings, there is illustrated in FIG. 1 the passenger compartment 10 of an automotive vehicle 12. Arranged within the compartment 10 are an instrument panel 14 and a windshield 16 which extend across the front region thereof.

As indicated above, there has heretofore been developed inflatable air bag devices located on the passenger side of automotive vehicles which act as a cushion when deployed to safely restrain passengers in the event of a crash. Such devices comprise an inflatable air bag stored behind the instrument panel 14 on the passenger side of the vehicle. In FIG. 1 an inflated air bag cushion 17 deployed from an air bag module 20 located behind the instrument panel 14 is shown in position to absorb the momentum and thereby protect a seated passenger 15.

Figure 2:
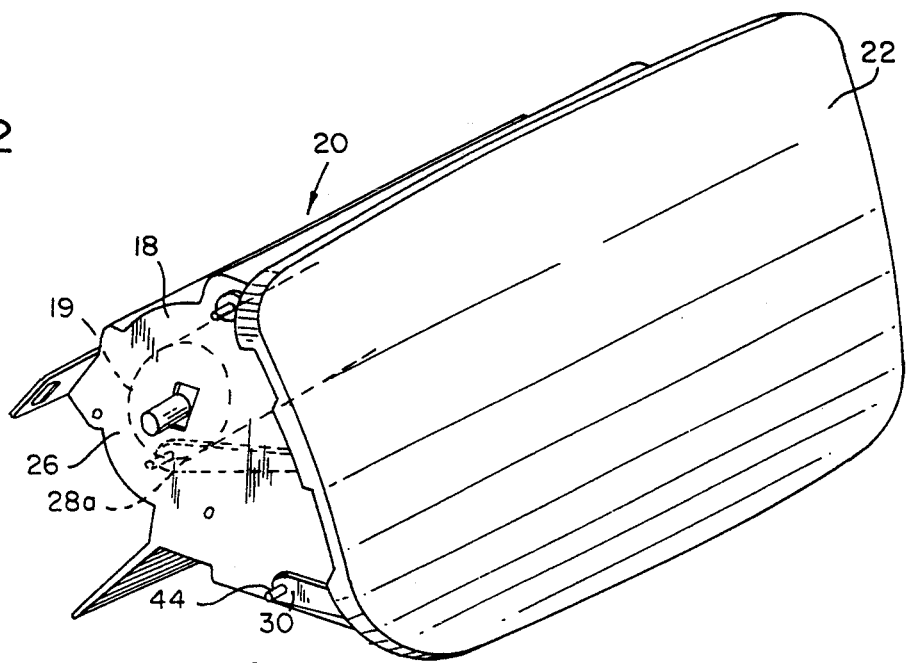
FIG. 2 is a perspective view of an air bag module according to the invention.

The onset of a crash is detected by a sensor (not shown) which activates an inflation device 19, which is internally located in the air bag module as indicated in dotted lines in FIG. 2, to produce a flow of inflating gas into the inflatable air bag 17. This causes the air bag 17 to be deployed as a protective cushion for the passenger 15 within the compartment 10.

As installed behind the instrument panel 14, the inflatable air bag 17 is in folded condition. The folded air bag and the inflation device are contained within a reaction canister 18 of the air bag module 20, which as shown in FIG. 2, is provided with a generally rectangular cover 22. The cover 22, as shown in FIG. 1, also comprises the cover or door for an air bag deployment opening 24 that is formed in a portion of the instrument panel 14.

Figure 3:
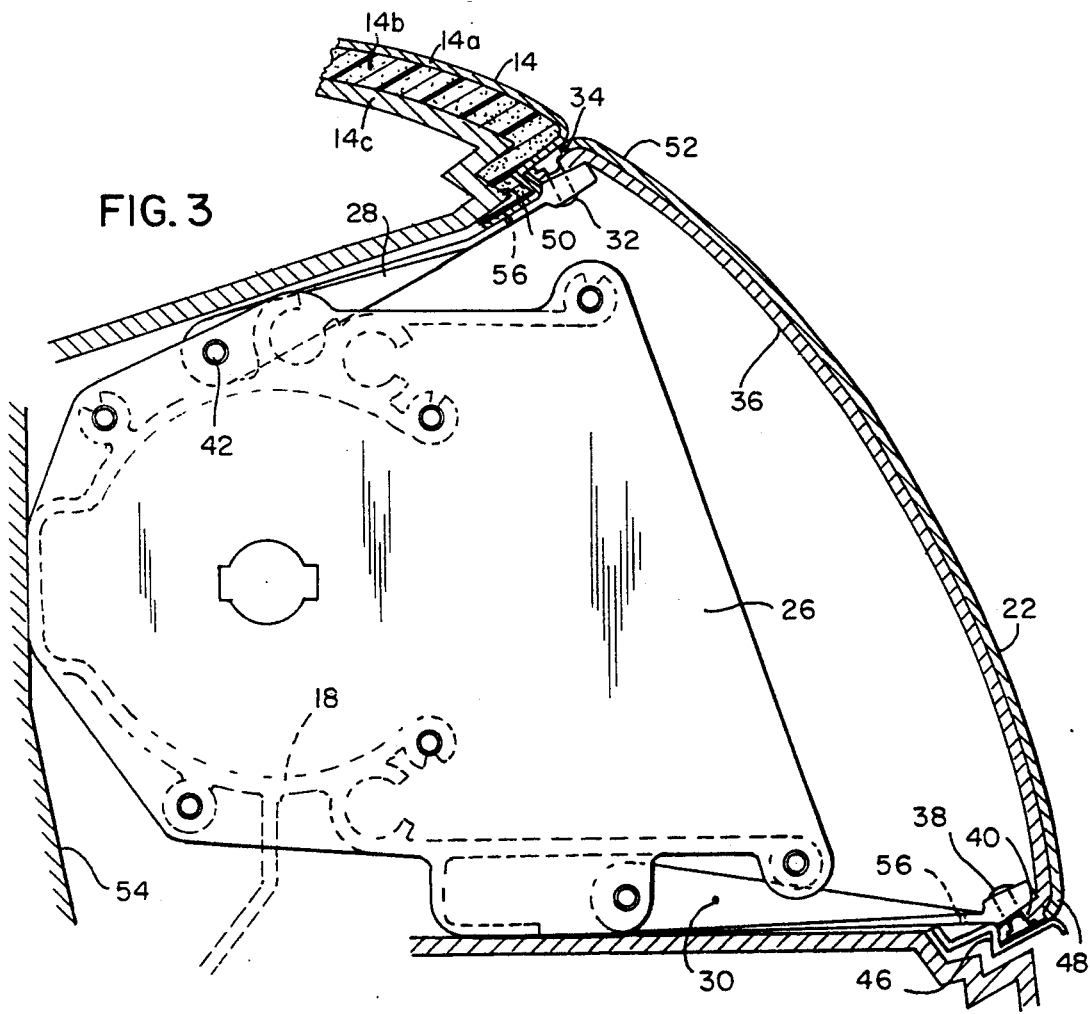
FIG. 3 is an end view of the air bag module of FIG. 2 mounted in the vehicle instrument panel shown in FIG. 1.

There is also shown in FIG. 2 and in FIG. 3 one end plate 26 of the reaction canister 18. Attached to the canister 18 are two straps designated 28 and 30 that connect the cover 22 to the reaction canister 18. The reaction canister 18 includes another end plate (not shown) that is similar to the end plate 26 and to which is attached two additional straps similar to the straps 28 and 30 and which also connect the cover 22 to the reaction canister 18.

The straps described connecting the cover 22 of the air bag module 20 to the end plates of the reaction canister 18 comprise a set of four straps that are used in a four-strap arrangement for a given cover situation. Shown in dotted lines in FIG. 2 is an optional two-strap position for the attachment of a single strap 28a to the end plate 26 of the reaction canister 18.

Figure 4:
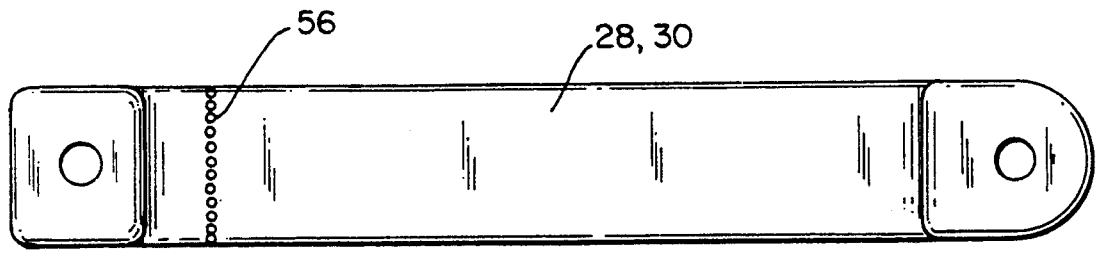
FIG. 4 is a plan view of the molded strap of flexible material shown in FIGS. 2 and 3 to attach the cover of the air bag module to the reaction canister thereof.
Figure 5:
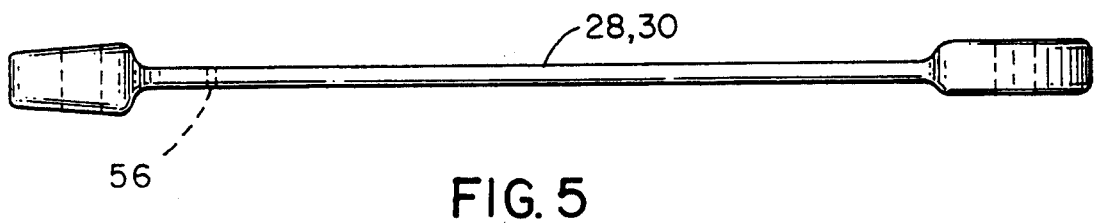
FIG. 5 is a side view of the molded strap shown in FIG. 4.

Each of the straps 28 and 30 is illustrated in FIGS. 4 and 5 and comprises a molded strap of flexible material such as rubber of appropriate tensile strength. Each strap 28 and 30 is of appropriate length, width and tensile properties to provide the desired tension on the air bag module cover 22 relative to the reaction canister 18 when the air bag module 20 is mounted in the instrument panel 14 through the opening 24.

Figure 6:
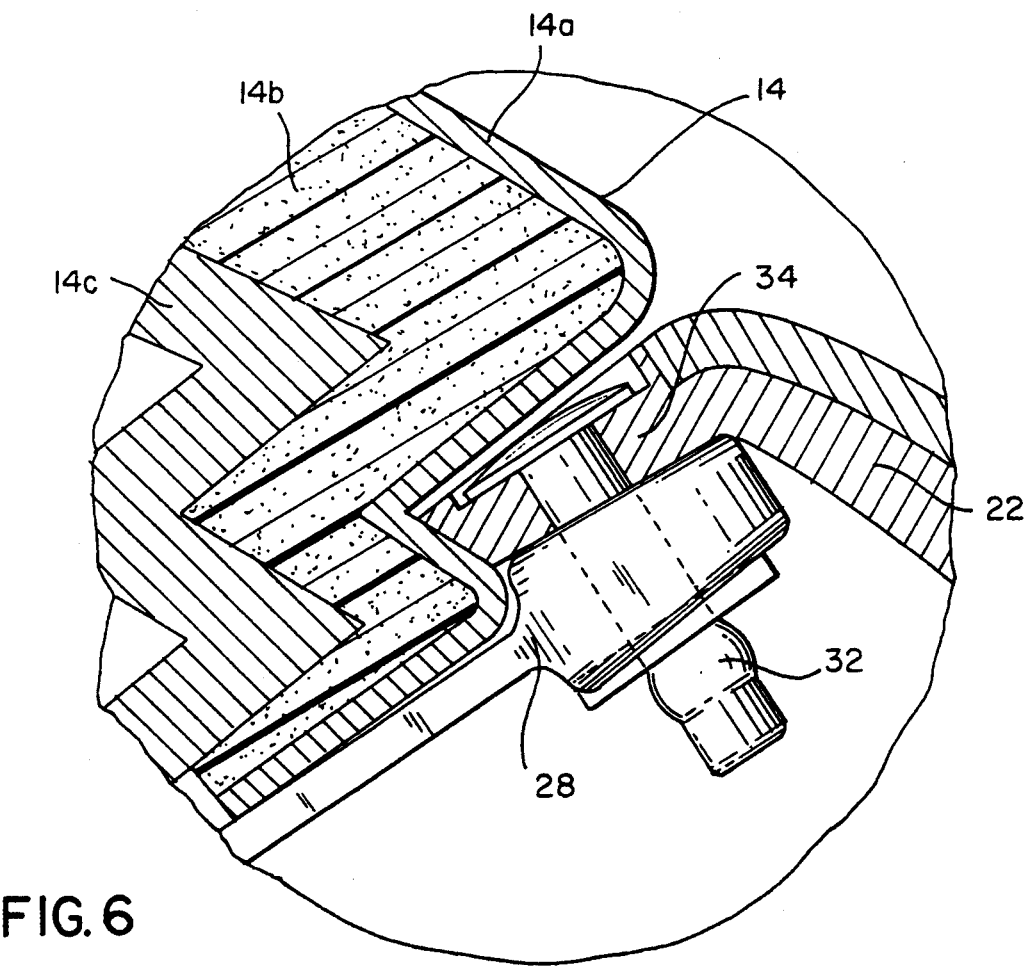
FIG. 6 is a view showing on an enlarged scale the attachment of one end of the molded strap to the cover of the air bag module.

As shown in FIGS. 2, 3 and 6, one end of strap 28 is attached by a rivet 32 to an integral flange 34 protruding from the rearward side of the substrate 36 of the air bag module cover 22. Similarly, one end of the strap 30 is attached by a rivet 38 to an integral flange 40 protruding from the forward side of the substrate 36 of the cover 22. The other ends of the straps 28 and 30 are attached to studs 42 and 44, respectively, that protrude from the end plate 26, as shown in FIGS. 2 and 3.

While the invention can be used with any type of instrument panel, the instrument panel 14, as illustrated in FIGS. 3 and 6, comprises an outer decorative skin or layer 14a, a foam core layer 14b beneath the skin layer 14a, and a rigid backing layer 14c. The air bag module cover 22 is located in an air bag deployment door closure relation to the opening 24 in the instrument panel 14. The opening 24 provides a positive stop or ledge 46 at the rearward edge 48 of the cover 22 and a similar positive stop or ledge 50 at forward edge 52 of the cover 22 for the cover 22 to be pulled up against. If desired, such positive stop or ledges may be provided on all four sides of the opening 24, that is, extend completely around the opening 24.

As the air bag module 20 is inserted into the opening 24 of the instrument panel, the cover 22 comes into a fully seated position Just slightly before the reaction canister 18 of the air bag module 20 reaches a fully mounting or seated position thereof in engagement with appropriate automotive vehicle mounting mechanism or supporting structure 54, as shown in FIG. 3, when properly mounted in the instrument panel 14. As a result, the straps 28 and 30 are pulled into tension as the reaction canister 18 is seated.

The flexibility of the straps 28 and 30 allows the cover 22 to "float," that is assume a position slightly in separation from the air bag module reaction canister 18 rather than being held in strict dimensional relationship therewith. While the cover 22 is actually attached to the reaction canister 18 by the attachment straps 28 and 30, the location of the position at which the cover 22 comes to a stop is determined by the forward ledge 50 and the rearward ledge 46, respectively, on the instrument panel 14.

Upon deployment of the inflatable air bag by the air bag module 20 responsively to the onset of a collision, each of the attachment straps 28 and 30 breaks or fails at a predetermined point such as at a reduced section or perforated region such as that indicated by the reference numeral 56 in FIGS. 4 and 5. Preferably, as shown in FIG. 3, the perforated region 56 in each of the straps 28 and 30 is provided at a position relatively close to the cover 22.

Figure 7:
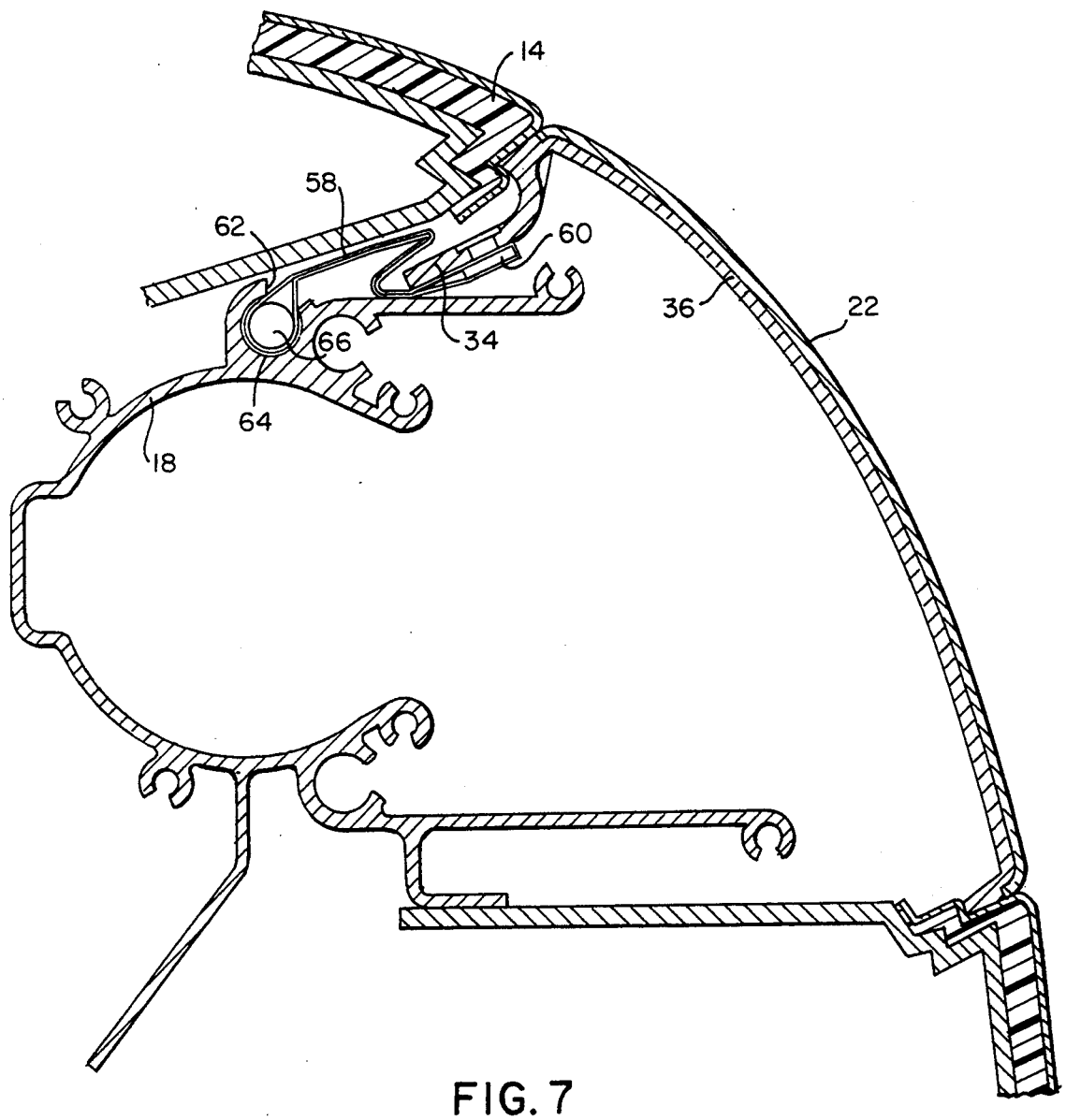
FIG. 7 illustrates the attachment of a tether to the cover of the air bag module for detenton of the cover upon deployment of the air bag.

A separate flexible tether 58, as shown in FIG. 7, between the cover 22 and the reaction canister 18 retains the cover 22 upon deployment of the air bag thereby preventing the cover 22 from flying out into the compartment 10 and injuring a passenger in the vehicle. The tether 58 is located on the top side of the cover 22 and is long enough to allow the cover 22 upon air bag deployment to rotate and swing upwardly from the instrument panel 14 out of the way of the inflating air bag.

As shown in FIG. 7, one end of the tether 58 is attached by bolt means 60 to the integral flange 34 protruding from the rearward side of the substrate 36 of the air bag module cover 22. The other end of the tether 58 is attached to a keyhole shaped slot 62 in the reaction canister 18. Explicitly, the other end of the tether 58 is formed into a loop 64 which is inserted into the keyhole shaped slot 62 in the reaction canister 18, and a rod 66 is inserted in the loop 64 and fastened securely in its inserted position.

Thus, there has been provided, in accordance with the invention, a novel method providing a reliable release for the cover of an air bag module responsively to the onset of a collision while allowing relative flexibility between the cover and the reaction canister of the air bag module and thereby eliminating tolerance stack up problems by allowing the location of the cover to be determined by the instrument panel where it is intended to fit.

With this description of the invention in detail, those skilled in the art will appreciate that modifications may be made in the invention without departing from the spirit thereof. Therefore, it is not intended that the scope of the invention be limited to the specific embodiment illustrated and described. Rather, it is intended that the scope of the invention be determined by the scope of the appended claims.

What is claimed is:

1. A method of attaching a cover to a passenger air bag module comprising the following steps:
   (a) attaching one end of each of a plurality of attachment straps to the air bag module cover;
   (b) attaching the other end of each of said plurality of straps to the air bag module;
   (c) providing a fully seated position for the air bag module behind the opening in a trim panel of an automotive vehicle; and
   (d) with each strap of appropriate length, width and tensile properties locating the module cover relative to the opening in the trim panel such that the opening provides a positive stop for the module cover to be pulled up against as the module is inserted into the opening to its seated position, whereby as the module is inserted into the opening in the trim panel the module cover comes into its fully seated position slightly before the module reaches its fully seated position and the attachment straps are pulled into tension as the module is seated.

2. A method as defined by claim 1 wherein in step (b) the other end of each of said plurality of straps is attached to the reaction canister of the air bag module.

3. A method as defined in claim 1 including the further step of:
   (e) providing each of said attachment straps with a weakened section so that upon activation of said air bag module and resultant inflation of the air bag the attachment straps break to allow the module cover to be pushed out of the way by the expanding air bag.

4. A method as defined by claim 3 wherein in step (e) the weakened section of each of the attachment straps is provided closely adjacent the attachment thereof to the air bag module cover.

5. An air bag means including a folded air bag and inflating means for inflating said folded air bag with both said folded air bag and said inflating means for inflating said folded air bag being stored behind an interior trim panel within the passenger compartment of an automotive vehicle,
   said folded air bag being inflated to be deployed into said passenger compartment during a collision through a deployment door formed in an opening in said trim panel,
   said trim panel being formed with a ledge means contributing partly at least to the definition of said opening formed in said trim panel,
   said air bag means including a reaction canister in which said folded air bag and said means for inflating said folded air bag are contained and a cover enclosing said folded air bag and said means for inflating said folded air bag, said cover having the shape of and comprising the deployment door formed in said trim panel,
   support means behind said trim panel forming a mounting mechanism for said reaction canister when said air bag means is installed in said trim panel, and
   flexible strap means connecting said cover to said reaction canister with the arrangement being such that said cover is pulled up against said ledge means on said trim panel and comes to a stop before said reaction canister is seated against said support means behind the trim panel forming a mounting position for said reaction canister,
   whereby said cover is allowed to float above the reaction canister and locate off the opening in the trim panel where it is intended to fit.

6. An air bag means as defined by claim 5, wherein said flexible strap means are provided with a weakened section so that upon deployment of said folded air bag said flexible means breaks to allow said cover to be pushed out of the way by the inflating air bag.

7. An air bag means as defined by claim 6 wherein said weakened section of said flexible strap means is provided adjacent the attachment thereof to said cover.

8. An air bag means as defined by claim 6 further including,
   a tether attaching said cover to said reaction canister to retain said cover upon deployment of said folded air bag thereby to prevent said cover from flying out into, the passenger compartment of the automotive vehicle.

9. An air bag means as defined in claim 6,
wherein said reaction canister has two ends and includes an end plate at each end,
wherein said cover includes integral flange means protruding from said cover substrate,
wherein said flexible strap comprises a plurality of flexible straps each of which have a first end attached to said cover and have a second end attached to stud means protruding from said reaction canister end plates.

10. An air bag means as defined in claim 9,
wherein the shape of said cover is generally rectangular and said integral flange protrudes from at least two opposed sides thereof,
wherein said flexible strap means comprises a plurality of flexible straps, each of which straps have a first end and a second end with one at least of said flexible strap first ends being attached to the integral flange protruding from one of said opposed sides and another of said flexible strap first ends being attached to the integral flange protruding from the other of said opposed sides, and
wherein the second end of said flexible straps associated with said first end are attached to a stud protruding from the other one of said reaction canister end plates.

11. An air bag means as defined in claim 9,
wherein the first end of each of a first plurality of flexible straps are attached to the integral flange protruding from one of the opposed sides of said cover,
wherein the first end of each of a second plurality of flexible straps are attached to the integral flange protruding from the other of the opposed sides of said cover,
wherein the second end of each of said first plurality of straps are attached to a stud protruding from one of said reaction canister end plates, and
wherein the second end of each of said second plurality of straps are attached to a stud protruding from the other of said reaction canister end plates.

12. An air bag means as defined in claim 10 further including,
a tether attaching said cover to said reaction canister to retain said cover upon deployment of said folded air bag thereby to prevent said cover from flying out into the passenger compartment of the automotive vehicle,
wherein a key hole shaped slot is provided in said reaction canister,
wherein one end of said tether is attached by bolt means to the integral flange protruding from one at least of the opposed sides of said cover,
wherein the other end of said tether is formed into a loop which is inserted in said slot in said reaction canister and further including
a rod inserted through the loop formed in the said other end of said tether, which rod is fastened securely in its inserted position.

* * * * *